(12) United States Patent
Zhang et al.

(10) Patent No.: US 11,158,116 B2
(45) Date of Patent: Oct. 26, 2021

(54) GEOMETRY MODEL FOR POINT CLOUD CODING

(71) Applicant: TENCENT AMERICA LLC, Palo Alto, CA (US)

(72) Inventors: Xiang Zhang, Palo Alto, CA (US); Wen Gao, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/926,110

(22) Filed: Jul. 10, 2020

(65) Prior Publication Data

US 2021/0042989 A1 Feb. 11, 2021

Related U.S. Application Data

(60) Provisional application No. 62/883,077, filed on Aug. 5, 2019.

(51) Int. Cl.
*G06T 15/10* (2011.01)
*G06F 9/30* (2018.01)
*G06T 17/10* (2006.01)
*G06T 9/00* (2006.01)

(52) U.S. Cl.
CPC .......... *G06T 15/10* (2013.01); *G06F 9/30196* (2013.01); *G06T 9/00* (2013.01); *G06T 17/10* (2013.01)

(58) Field of Classification Search
CPC .................. G06T 9/001; G06T 15/10
See application file for complete search history.

(56) References Cited

U.S. PATENT DOCUMENTS

| | | | |
|---|---|---|---|
| 2020/0020133 A1* | 1/2020 | Najaf-Zadeh | G06T 5/002 |
| 2020/0045348 A1* | 2/2020 | Boyce | G06T 15/005 |
| 2020/0153885 A1* | 5/2020 | Lee | G06T 9/001 |
| 2020/0258202 A1* | 8/2020 | Cai | G06T 9/40 |
| 2020/0296427 A1* | 9/2020 | Ricard | H04N 19/186 |
| 2020/0380765 A1* | 12/2020 | Thudor | G06T 17/10 |
| 2020/0388004 A1* | 12/2020 | Zhang | G06T 3/0075 |
| 2021/0056730 A1* | 2/2021 | Ricard | G06T 9/00 |

OTHER PUBLICATIONS

"Information technology—MPEG-I (Coded Representation of Immersive Media)—Part 9: Geometry-based Point Cloud Compression", CD Stage, ISO/IEC 23090-9, 2019, 104 pages.
Khaled Mammou, et al., "G-PCC codec description v2", 3DG, ISO/IEC JTC1/SC29/WG11 N18189, Jan. 2019, 39 pages, Marrakech, MA.
Christian Tulvan, et al., "Use Cases for Point Cloud Compression (PCC)", ISO/IEC JTC1/SC29/WG11 MPEG2015/ N16331, Jun. 2016, 8 pages, Geneva, CH.
Rufael Mekuria, et al., "Requirements for Point Cloud Compression", ISO/IEC JTC1/SC29/WG11 MPEG2016/n16330, Feb. 2016, 3 pages, Geneva, CH.

* cited by examiner

*Primary Examiner* — Phi Hoang
(74) *Attorney, Agent, or Firm* — Sughrue Mion, PLLC

(57) ABSTRACT

A method, computer program, and computer system for point cloud coding is provided. Data corresponding to a point cloud is received, and one or more geometric features are detected from among the data corresponding to the point cloud. A representation is determined for one or more of the detected geometric features, and the received data is encoded or decoded based on the determined representations whereby the point cloud is reconstructed based on the decoded data.

15 Claims, 18 Drawing Sheets

200A

| geometry_parameter_set( ) { | Descriptor |
|---|---|
|   gps_geom_parameter_set_id | ue(v) |
|   gps_seq_parameter_set_id | ue(v) |
|   gps_box_present_flag | u(1) |
|   if( gps_box_present_flag ){ | |
|     gps_gsh_box_log2_scale_present_flag | u(1) |
|     if( gps_gsh_box_log2_scale_present_flag == 0 ) | |
|       gps_gsh_box_log2_scale | ue(v) |
|   } | |
|   unique_geometry_points_flag | u(1) |
|   neighbour_context_restriction_flag | u(1) |
|   inferred_direct_coding_mode_enabled_flag | u(1) |
|   bitwise_occupancy_coding_flag | u(1) |
|   adjacent_child_contextualization_enabled_flag | u(1) |
|   log2_neighbour_avail_boundary | ue(v) |
|   log2_intra_pred_max_node_size | ue(v) |
|   log2_trisoup_node_size | ue(v) |
|   gps_line_model_flag | u(1) |
|   gps_extension_present_flag | u(1) |
|   if( gps_extension_present_flag ) | |
|     while( more_data_in_byte_stream( ) ) | |
|       gps_extension_data_flag | u(1) |
|   byte_alignment( ) | |
| } | |

| geometry_parameter_set( ) { | Descriptor |
|---|---|
|   gps_geom_parameter_set_id | ue(v) |
|   ... | ... |
|   log2_trisoup_node_size | ue(v) |
|   gps_line_model_flag | u(1) |
|   if( gps_line_model_flag ) { | |
|     line_min_num_point_minus_two | ue(v) |
|   } | |
|   ... | ... |
|   byte_alignment( ) | |
| } | |

| geometry_parameter_set( ) { | Descriptor |
|---|---|
|   gps_geom_parameter_set_id | ue(v) |
|   ... | ... |
|   log2_trisoup_node_size | ue(v) |
|   gps_line_model_flag | u(1) |
|   if( gps_line_model_flag ) { | |
|     line_min_num_point_minus_two | ue(v) |
|     line_present_depth | ue(v) |
|   } | |
|   ... | ... |
|   byte_alignment( ) | |
| } | |

| geometry_parameter_set( ) { | Descriptor |
|---|---|
|   gps_geom_parameter_set_id | ue(v) |
|   ... | ... |
|   log2_trisoup_node_size | ue(v) |
|   gps_line_model_flag | u(1) |
|   if( gps_line_model_flag ) { | |
|     line_min_num_point_minus_two | ue(v) |
|     line_min_depth | ue(v) |
|     line_max_depth | ue(v) |
|     gps_line_signal_residual_flag | u(1) |
|   } | |
|   ... | ... |
|   byte_alignment( ) | |
| } | |

| geometry_parameter_set( ) { | Descriptor |
|---|---|
|    gps_geom_parameter_set_id | ue(v) |
|    ... | ... |
|    log2_trisoup_node_size | ue(v) |
|    gps_line_model_flag | u(1) |
|    if( gps_line_model_flag ) { | |
|       line_min_num_point_minus_two | ue(v) |
|       line_qs_start_pos | ue(v) |
|       line_qs_end_pos | ue(v) |
|       line_qs_dir_theta | ue(v) |
|       line_qs_dir_phi | ue(v) |
|       line_qs_interval | ue(v) |
|       line_qs_residual | ue(v) |
|    } | |
|    ... | ... |
|    byte_alignment( ) | |
| } | |

| geometry_parameter_set( ) { | Descriptor |
|---|---|
|    gps_geom_parameter_set_id | ue(v) |
|    ... | ... |
|    log2_trisoup_node_size | ue(v) |
|    gps_line_model_flag | u(1) |
|    if( gps_line_model_flag ) { | |
|       line_min_num_point_minus_two | ue(v) |
|       line_qs_start_pos | ue(v) |
|       line_qs_end_pos | ue(v) |
|       line_qs_dir | ue(v) |
|       line_qs_interval | ue(v) |
|       line_qs_residual | ue(v) |
|    } | |
|    ... | ... |
|    byte_alignment( ) | |
| } | |

| geometry_parameter_set( ) { | Descriptor |
|---|---|
|    gps_geom_parameter_set_id | ue(v) |
|    ... | ... |
|    log2_trisoup_node_size | ue(v) |
|    gps_line_model_flag | u(1) |
|    if( gps_line_model_flag ) { | |
|       line_min_num_point_minus_two | ue(v) |
|       line_qs_lambda | ue(v) |
|    } | |
|    ... | ... |
|    byte_alignment( ) | |
| } | |

| Geometry_line() { | Descriptor |
|---|---|
|    geo_number_lines | ae(v) |
|    if( geo_number_lines > 0 ) { | |
|       for ( i = 0; i < geo_number_lines; i++ ) { | |
|          geo_line_pnt_count_minus_min_num [ i ] | ae(v) |
|          geo_line_start_pos_x [ i ] | ae(v) |
|          geo_line_start_pos_y [ i ] | ae(v) |
|          geo_line_start_pos_z [ i ] | ae(v) |
|          geo_line_end_pos_x [ i ] | ae(v) |
|          geo_line_end_pos_y [ i ] | ae(v) |
|          geo_line_end_pos_z [ i ] | ae(v) |
|       } | |
|    } | |
| } | |

| Geometry_line() { | Descriptor |
|---|---|
| geo_number_lines | ae(v) |
| if( geo_number_lines > 0 ) { | |
| for ( i = 0; i < geo_number_lines; i++) { | |
| geo_line_pnt_count_minus_min_num [ i ] | ae(v) |
| geo_line_start_pos_x_quant [ i ] | ae(v) |
| geo_line_start_pos_y_quant [ i ] | ae(v) |
| geo_line_start_pos_z_quant [ i ] | ae(v) |
| geo_line_end_pos_x_quant [ i ] | ae(v) |
| geo_line_end_pos_y_quant [ i ] | ae(v) |
| geo_line_end_pos_z_quant [ i ] | ae(v) |
| } | |
| } | |
| } | |

| Geometry_line() { | Descriptor |
|---|---|
| geo_number_lines | ae(v) |
| if( geo_number_lines > 0 ) { | |
| for ( i = 0; i < geo_number_lines; i++) { | |
| geo_line_pnt_count_minus_min_num [ i ] | ae(v) |
| geo_line_start_pos_x [ i ] | ae(v) |
| geo_line_start_pos_y [ i ] | ae(v) |
| geo_line_start_pos_z [ i ] | ae(v) |
| geo_line_end_pos_x_minus_start_pos_x [ i ] | ae(v) |
| geo_line_end_pos_y_minus_start_pos_y [ i ] | ae(v) |
| geo_line_end_pos_z_minus_start_pos_z [ i ] | ae(v) |
| } | |
| } | |
| } | |

| | Descriptor |
|---|---|
| geometry_node( depth, nodeIdx, xN, yN, zN ) { | |
|   if( GeoLineModelFlagPresent ) { | |
|     Geometry_line() | |
|   } | |
|   if( NeighbourPattern == 0 ) { | |
|     single_occupancy_flag | ae(v) |
|     if( single_occupancy_flag ) | |
|       occupancy_idx | ae(v) |
|   } | |
|   if( !single_occupancy_flag ) | |
|     if( bitwise_occupancy_flag ) | |
|       occupancy_map | ae(v) |
|     else | |
|       occupancy_byte | de(v) |
|   if( depth == MaxGeometryOctreeDepth - 1 ) | |
|     if( !unique_geometry_points_flag ) | |
|       for( child = 0; child < GeometryNodeChildrenCnt; child++ ) { | |
|         num_points_eq1_flag[ child ] | ae(v) |
|         if( !num_points_eq1_flag ) | |
|           num_points_minus2[ child ] | ae(v) |
|       } | |
|   } else { | |
|     if( DirectModeFlagPresent ) | |
|       direct_mode_flag | ae(v) |
|     if( direct_mode_flag ) { | |
|       num_direct_points_minus1 | ae(v) |
|       for( i = 0; i <= num_direct_points_minus1; i++ ) | |
|         for( j = 0; j < ChildNodeSizeLog2; j++ ) { | |
|           point_offset_x[ i ][ j ] | ae(v) |
|           point_offset_y[ i ][ j ] | ae(v) |
|           point_offset_z[ i ][ j ] | ae(v) |
|         } | |
|     } | |
|   } | |
| } | |

| Geometry_line() { | Descriptor |
|---|---|
| geo_number_lines | ae(v) |
| if( geo_number_lines > 0 ) { | |
| for ( i = 0; i < geo_number_lines; i++) { | |
| geo_line_pnt_count_minus_min_num [ i ] | ae(v) |
| geo_line_start_pos_x [ i ] | ae(v) |
| geo_line_start_pos_y [ i ] | ae(v) |
| geo_line_start_pos_z [ i ] | ae(v) |
| geo_line_dir_x [ i ] | ae(v) |
| geo_line_dir_y [ i ] | ae(v) |
| geo_line_dir_z [ i ] | ae(v) |
| } | |
| } | |
| } | |

| Geometry_line() { | Descriptor |
|---|---|
| geo_number_lines | ae(v) |
| if( geo_number_lines > 0 ) { | |
| for ( i = 0; i < geo_number_lines; i++) { | |
| geo_line_pnt_count_minus_min_num [ i ] | ae(v) |
| geo_line_start_pos_x [ i ] | ae(v) |
| geo_line_start_pos_y [ i ] | ae(v) |
| geo_line_start_pos_z [ i ] | ae(v) |
| geo_line_dir_x_quant [ i ] | ae(v) |
| geo_line_dir_y_quant [ i ] | ae(v) |
| geo_line_dir_z_quant [ i ] | ae(v) |
| } | |
| } | |
| } | |

| Geometry_line() { | Descriptor |
|---|---|
| geo_number_lines | ae(v) |
| if( geo_number_lines > 0 ) { | |
| for ( i = 0; i < geo_number_lines; i++ ) { | |
| geo_line_pnt_count_minus_min_num [ i ] | ae(v) |
| geo_line_start_pos_x [ i ] | ae(v) |
| geo_line_start_pos_y [ i ] | ae(v) |
| geo_line_start_pos_z [ i ] | ae(v) |
| geo_line_dir_theta_sign [ i ] | ae(v) |
| geo_line_dir_abs_theta_quant [ i ] | ae(v) |
| geo_line_dir_phi_sign [ i ] | ae(v) |
| geo_line_dir_abs_phi_quant [ i ] | ae(v) |
| } | |
| } | |
| } | |

| Geometry_line() { | Descriptor |
|---|---|
| geo_number_lines | ae(v) |
| if( geo_number_lines > 0 ) { | |
| for ( i = 0; i < geo_number_lines; i++ ) { | |
| geo_line_pnt_count_minus_min_num [ i ] | ae(v) |
| geo_line_start_pos_x [ i ] | ae(v) |
| geo_line_start_pos_y [ i ] | ae(v) |
| geo_line_start_pos_z [ i ] | ae(v) |
| geo_line_dir_theta_sign [ i ] | ae(v) |
| geo_line_dir_abs_theta_quant [ i ] | ae(v) |
| geo_line_dir_phi_quant [ i ] | ae(v) |
| } | |
| } | |
| } | |

| Geometry_line() { | Descriptor |
|---|---|
|   geo_number_lines | ae(v) |
|   if( geo_number_lines > 0 ) { | |
|     for ( i = 0; i < geo_number_lines; i++) { | |
|       geo_line_pnt_count_minus_min_num [ i ] | ae(v) |
|       geo_line_start_pos_x [ i ] | ae(v) |
|       geo_line_start_pos_y [ i ] | ae(v) |
|       geo_line_start_pos_z [ i ] | ae(v) |
|       geo_line_dir_theta_sign [ i ] | ae(v) |
|       geo_line_dir_abs_theta_quant [ i ] | ae(v) |
|       geo_line_dir_phi_quant [ i ] | ae(v) |
|       for ( j = 0; j < geo_line_pnt_count[ i ] - 1; j++) { | |
|         geo_line_interval [ i ][ j ] | ae(v) |
|       } | |
|     } | |
|   } | |
| } | |

| Geometry_line() { | Descriptor |
|---|---|
|   geo_number_lines | ae(v) |
|   if( geo_number_lines > 0 ) { | |
|     for ( i = 0; i < geo_number_lines; i++) { | |
|       geo_line_pnt_count_minus_min_num [ i ] | ae(v) |
|       geo_line_start_pos_x [ i ] | ae(v) |
|       geo_line_start_pos_y [ i ] | ae(v) |
|       geo_line_start_pos_z [ i ] | ae(v) |
|       geo_line_dir_theta_sign [ i ] | ae(v) |
|       geo_line_dir_abs_theta_quant [ i ] | ae(v) |
|       geo_line_dir_phi_quant [ i ] | ae(v) |
|       for ( j = 0; j < geo_line_pnt_count[ i ] - 1; j++) { | |
|         geo_line_interval_quant [ i ][ j ] | ae(v) |
|       } | |
|     } | |
|   } | |
| } | |

| Geometry_line() { | Descriptor |
|---|---|
| geo_number_lines | ae(v) |
| if( geo_number_lines > 0 ) { | |
| for ( i = 0; i < geo_number_lines; i++) { | |
| geo_line_pnt_count_minus_min_num [ i ] | ae(v) |
| geo_line_start_pos_x [ i ] | ae(v) |
| geo_line_start_pos_y [ i ] | ae(v) |
| geo_line_start_pos_z [ i ] | ae(v) |
| geo_line_dir_theta_sign [ i ] | ae(v) |
| geo_line_dir_abs_theta_quant [ i ] | ae(v) |
| geo_line_dir_phi_quant [ i ] | ae(v) |
| geo_line_avg_interval [ i ] | ae(v) |
| } | |
| } | |
| } | |

| Geometry_line() { | Descriptor |
|---|---|
| geo_number_lines | ae(v) |
| if( geo_number_lines > 0 ) { | |
| for ( i = 0; i < geo_number_lines; i++) { | |
| geo_line_pnt_count_minus_min_num [ i ] | ae(v) |
| geo_line_start_pos_x [ i ] | ae(v) |
| geo_line_start_pos_y [ i ] | ae(v) |
| geo_line_start_pos_z [ i ] | ae(v) |
| geo_line_dir_theta_sign [ i ] | ae(v) |
| geo_line_dir_abs_theta_quant [ i ] | ae(v) |
| geo_line_dir_phi_quant [ i ] | ae(v) |
| geo_line_avg_interval_quant [ i ] | ae(v) |
| } | |
| } | |
| } | |

| Geometry_line() { | Descriptor |
|---|---|
| geo_number_lines | ae(v) |
| if( geo_number_lines > 0 ) { | |
| for ( i = 0; i < geo_number_lines; i++ ) { | |
| geo_line_start_pos_x [ i ] | ae(v) |
| geo_line_start_pos_y [ i ] | ae(v) |
| geo_line_start_pos_z [ i ] | ae(v) |
| geo_line_dir_theta_sign [ i ] | ae(v) |
| geo_line_dir_abs_theta_quant [ i ] | ae(v) |
| geo_line_dir_phi_quant [ i ] | ae(v) |
| geo_line_num_segment [ i ] | ae(v) |
| for ( s = 0; s < geo_line_num_segment [ i ]; s++ ) { | |
| geo_line_segment_num_interval [ i ][ s ] | ae(v) |
| geo_line_segment_avg_interval [ i ][ s ] | ae(v) |
| } | |
| } | |
| } | |
| } | |

| Geometry_line() { | Descriptor |
|---|---|
| geo_number_lines | ae(v) |
| if( geo_number_lines > 0 ) { | |
| for ( i = 0; i < geo_number_lines; i++ ) { | |
| geo_line_start_pos_x [ i ] | ae(v) |
| geo_line_start_pos_y [ i ] | ae(v) |
| geo_line_start_pos_z [ i ] | ae(v) |
| geo_line_dir_theta_sign [ i ] | ae(v) |
| geo_line_dir_abs_theta_quant [ i ] | ae(v) |
| geo_line_dir_phi_quant [ i ] | ae(v) |
| geo_line_num_segment [ i ] | ae(v) |
| for ( s = 0; s < geo_line_num_segment [ i ]; s++ ) { | |
| geo_line_segment_num_pnt [ i ][ s ] | ae(v) |
| geo_line_segment_avg_interval_quant [ i ][ s ] | ae(v) |
| } | |
| } | |
| } | |
| } | |

| Geometry_line() { | Descriptor |
|---|---|
|   geo_number_lines | ae(v) |
|   if( geo_number_lines > 0 ){ | |
|     for ( i = 0; i < geo_number_lines; i++) { | |
|       geo_line_pnt_count_minus_min_num [ i ] | ae(v) |
|       geo_line_start_pos_x [ i ] | ae(v) |
|       geo_line_start_pos_y [ i ] | ae(v) |
|       geo_line_start_pos_z [ i ] | ae(v) |
|       geo_line_dir_theta_sign [ i ] | ae(v) |
|       geo_line_dir_abs_theta_quant [ i ] | ae(v) |
|       geo_line_dir_phi_quant [ i ] | ae(v) |
|       if(gps_line_signal_residual_flag){ | |
|         for ( j = 0; j < geo_line_pnt_count[ i ]; j++) { | |
|           geo_line_residual_x[i][j] | ae(v) |
|           geo_line_residual_y[i][j] | ae(v) |
|           geo_line_residual_z[i][j] | ae(v) |
|         } | |
|       } | |
|     } | |
|   } | |
| } | |

| Geometry_line() { | Descriptor |
|---|---|
|   geo_number_lines | ae(v) |
|   if( geo_number_lines > 0 ){ | |
|     for ( i = 0; i < geo_number_lines; i++) { | |
|       geo_line_pnt_count_minus_min_num [ i ] | ae(v) |
|       geo_line_start_pos_x [ i ] | ae(v) |
|       geo_line_start_pos_y [ i ] | ae(v) |
|       geo_line_start_pos_z [ i ] | ae(v) |
|       geo_line_dir_theta_sign [ i ] | ae(v) |
|       geo_line_dir_abs_theta_quant [ i ] | ae(v) |
|       geo_line_dir_phi_quant [ i ] | ae(v) |
|       geo_line_num_segment [ i ] | ae(v) |
|       if(gps_line_signal_residual_flag){ | |
|         for ( j = 0; j < geo_line_pnt_count[ i ]; j++) { | |
|           geo_line_residual_x_quant[i][j] | ae(v) |
|           geo_line_residual_y_quant[i][j] | ae(v) |
|           geo_line_residual_z_quant[i][j] | ae(v) |
|         } | |
|       } | |
|     } | |
|   } | |
| } | |

FIG. 2Z

GEOMETRY MODEL FOR POINT CLOUD CODING

CROSS-REFERENCE TO RELATED APPLICATION

This application claims priority based on U.S. Provisional Application No. 62/883,077, the entirety of which is incorporated herein.

FIELD

This disclosure relates generally to field of data processing, and more particularly to point cloud data encoding and decoding.

BACKGROUND

Point clouds contain a set of high dimensional points, typically of three dimensional (3D), each including 3D position information and additional attributes such as color, reflectance, etc. They can be captured using multiple cameras and depth sensors, or Lidar in various setups, and may be made up of thousands up to billions of points to realistically represent the original scenes. Compression technologies are needed to reduce the amount of data required to represent a point cloud for faster transmission or reduction of storage. In the test model for categories 1 and 3 (TMC13), the geometry information and the associated attributes, such as color or reflectance, are separately compressed. The geometry information, which is the 3D coordinates of point clouds, is coded by octree-partition with its occupancy information. The attributes are then compressed based on reconstructed geometry using prediction, lifting and region adaptive hierarchical transform (BAHT) techniques.

SUMMARY

Embodiments relate to a method, system, and computer readable medium for point cloud coding. According to one aspect, a method for point cloud coding is provided. The method may include receiving data corresponding to a point cloud. One or more geometric features are detected from among the data corresponding to the point cloud. A representation is determined for one or more of the detected geometric features. The received data is decoded based on the determined representations, whereby the point cloud is reconstructed from the decoded data.

According to another aspect, a computer system for point cloud coding is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving data corresponding to a point cloud. One or more geometric features are detected from among the data corresponding to the point cloud. A representation is determined for one or more of the detected geometric features. The received data corresponding to the point cloud is decoded based on the determined representations, whereby the point cloud is reconstructed from the decoded data.

According to yet another aspect, a computer readable medium for point cloud coding is provided. The computer readable medium may include one or more computer-readable storage devices and program instructions stored on at least one of the one or more tangible storage devices, the program instructions executable by a processor. The program instructions are executable by a processor for performing a method that may accordingly include receiving data corresponding to a point cloud. One or more geometric features are detected from among the data corresponding to the point cloud. A representation is determined for one or more of the detected geometric features. The received data corresponding to the point cloud is decoded based on the determined representations, whereby the point cloud is reconstructed from the decoded data.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings.

DETAILED DESCRIPTION

Figure 1:
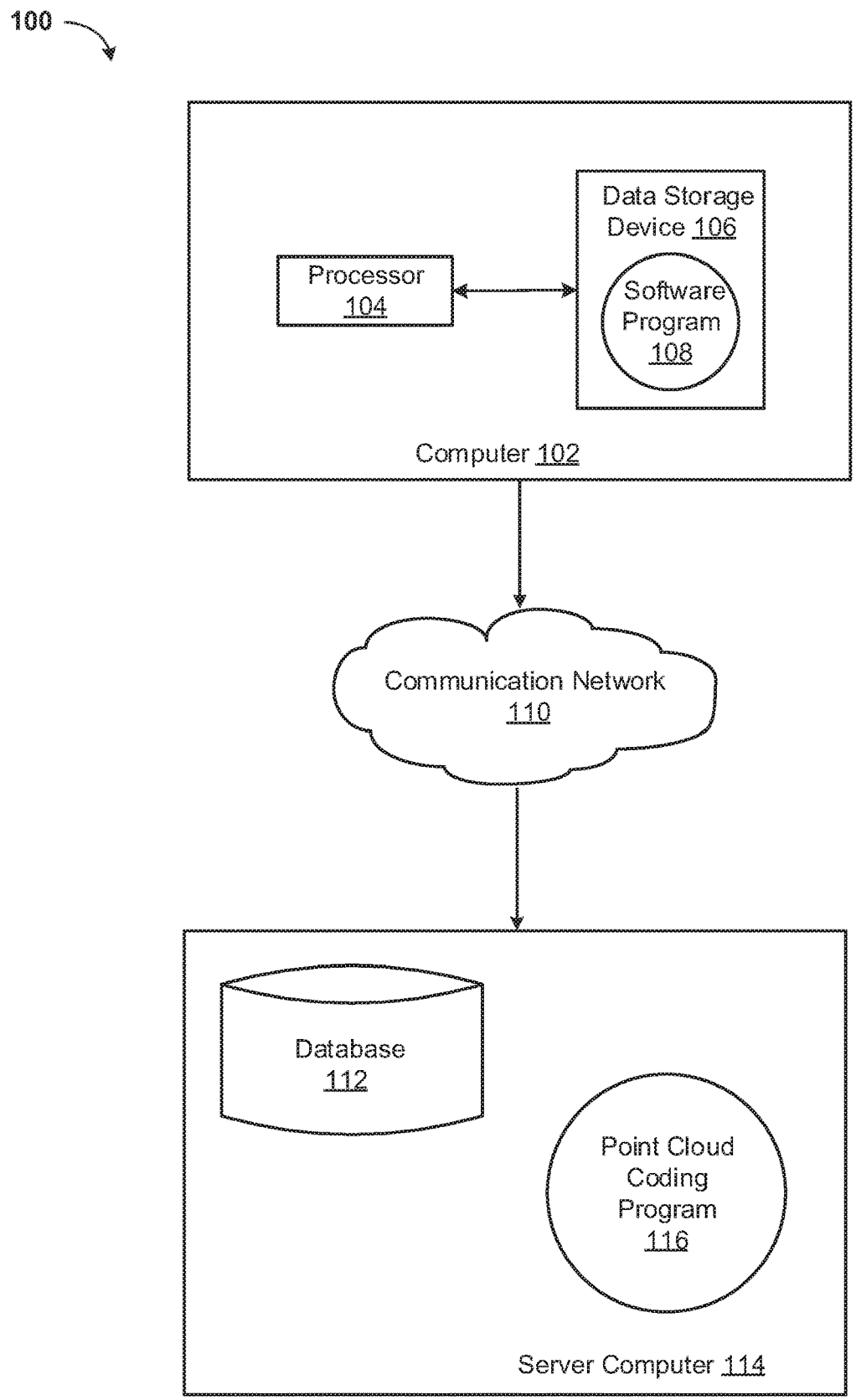
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

Embodiments relate generally to the field of data processing, and more particularly to data encoding and decoding. The following described exemplary embodiments provide a system, method and computer program for, among other things, point cloud coding. Therefore, some embodiments have the capacity to improve the field of computing by allowing for the representation of point cloud data as geometric features to allow for higher compression of the point cloud data.

As previously described, point clouds contain a set of high dimensional points, typically of three dimensional (3D), each including 3D position information and additional attributes such as color, reflectance, etc. They can be captured using multiple cameras and depth sensors, or Lidar in various setups, and may be made up of thousands up to billions of points to realistically represent the original scenes. Compression technologies are needed to reduce the amount of data required to represent a point cloud for faster transmission or reduction of storage. In the test model for categories 1 and 3 (TMC13), the geometry information and the associated attributes, such as color or reflectance, are separately compressed. The geometry information, which is the 3D coordinates of point clouds, is coded by octree-partition with its occupancy information. The attributes are then compressed based on reconstructed geometry using prediction, lifting and region adaptive hierarchical transform (RAHT) techniques. The geometry of point clouds may be represented by an octree model and may be encoded by the occupancy codes associated with each octree nodes. However, the octree coding method may be less efficient for point clouds with explicit geometrical structures. For example, some parts of the point cloud may illustrate strong spatial linearity. It may be advantageous, therefore, to represent and encode these portions of the point cloud by geometrical models (e.g., straight lines, parabolas, circles, eclipses, planes, cylinders, cubes, etc.).

Aspects are described herein with reference to flowchart illustrations and/or block diagrams of methods, apparatus (systems), and computer readable media according to the various embodiments. It will be understood that each block of the flowchart illustrations and/or block diagrams, and combinations of blocks in the flowchart illustrations and/or block diagrams, can be implemented by computer readable program instructions.

Referring now to FIG. 1, a functional block diagram of a networked computer environment illustrating a point cloud coding system 100 (hereinafter "system") for encoding point cloud data using geometric features. It should be appreciated that FIG. 1 provides only an illustration of one implementation and does not imply any limitations with regard to the environments in which different embodiments may be implemented. Many modifications to the depicted environments may be made based on design and implementation requirements.

The system 100 may include a computer 102 and a server computer 114. The computer 102 may communicate with the server computer 114 via a communication network 110 (hereinafter "network"). The computer 102 may include a processor 104 and a software program 108 that is stored on a data storage device 106 and is enabled to interface with a user and communicate with the server computer 114. As will be discussed below with reference to FIG. 4 the computer 102 may include internal components 800A and external components 900A, respectively, and the server computer 114 may include internal components 800B and external components 900B, respectively. The computer 102 may be, for example, a mobile device, a telephone, a personal digital assistant, a netbook, a laptop computer, a tablet computer, a desktop computer, or any type of computing devices capable of running a program, accessing a network, and accessing a database.

The server computer 114 may also operate in a cloud computing service model, such as Software as a Service (SaaS), Platform as a Service (PaaS), or Infrastructure as a Service (IaaS), as discussed below with respect to FIGS. 5 and 6. The server computer 114 may also be located in a cloud computing deployment model, such as a private cloud, community cloud, public cloud, or hybrid cloud.

The server computer 114, which may be used for point cloud coding is enabled to run a Point Cloud Coding Program 116 (hereinafter "program") that may interact with a database 112. The Point Cloud Coding Program method is explained in more detail below with respect to FIG. 3. In one embodiment, the computer 102 may operate as an input device including a user interface while the program 116 may run primarily on server computer 114. In an alternative embodiment, the program 116 may run primarily on one or more computers 102 while the server computer 114 may be used for processing and storage of data used by the program 116. It should be noted that the program 116 may be a standalone program or may be integrated into a larger point cloud coding program.

It should be noted, however, that processing for the program 116 may, in some instances be shared amongst the computers 102 and the server computers 114 in any ratio. In another embodiment, the program 116 may operate on more than one computer, server computer, or some combination of computers and server computers, for example, a plurality of computers 102 communicating across the network 110 with a single server computer 114. In another embodiment, for example, the program 116 may operate on a plurality of server computers 114 communicating across the network 110 with a plurality of client computers. Alternatively, the program may operate on a network server communicating across the network with a server and a plurality of client computers.

The network 110 may include wired connections, wireless connections, fiber optic connections, or some combination thereof. In general, the network 110 can be any combination of connections and protocols that will support communications between the computer 102 and the server computer 114. The network 110 may include various types of networks, such as, for example, a local area network (LAN), a wide area network (WAN) such as the Internet, a telecommunication network such as the Public Switched Telephone Network (PSTN), a wireless network, a public switched network, a satellite network, a cellular network (e.g., a fifth generation (5G) network, a long-term evolution (LTE) network, a third generation (3G) network, a code division multiple access (CDMA) network, etc.), a public land mobile network (PLMN), a metropolitan area network (MAN), a private network, an ad hoc network, an intranet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of system 100 may perform one or more functions described as being performed by another set of devices of system 100.

FIGS. 2A-2Z depict exemplary syntax parameters for signaling of a geometry model, according to one or more embodiments. The signaling of the geometry model may have two parts: control parameters that may specify when and where the geometry model is applied and parameters that determine the quantization step-sizes; and signaling the parameters for reconstruction, which may include the number of points, start and end positions, direction vectors, the projection intervals, the geometry residuals, etc. The first part of control parameters can be specified in high level syntax in a sequence header or a slice header of the bitstream. The second part of parameters for reconstruction can be specified separately from the octree coding syntaxes, or they can be specified jointly with octree coding syntaxes.

Referring now to FIG. 2A, a syntax parameter 200A depicts a flag can be signaled to indicate whether the geometry line model is enabled or disabled. gps_line_model_flag equal to 1 may specify that the geometry line model is enabled for the sequence or slice. gps_line_model_flag equal to 0 may specify that the geometry line model is disabled for the sequence or slice.

Referring now to FIG. 2B, a syntax parameter 200B depicts a flag for the minimal number of points that can be detected as a line that may be either fixed or specified by syntax. line_min_num_point_minus_two may specify the minimal number of points on a line as LineMinNumPnt=line_min_num_point_minus_two+2.

Figure 2C:
FIGS. 2A-2Z are syntax elements, according to at least one embodiment.

Referring now to FIG. 2C, a syntax parameter 200C for signaling the minimum and maximum depths in the geometry parameter set is depicted. The geometry line model may only be enabled at certain depths of octree partition. Therefore, one or two control parameters can be either fixed or signaled to indicate the minimum and maximum depths that allow geometry line model. line_min_depth may specify the minimum octree partition depth that enables the geometry line model. line_max_depth may specify the maximum octree partition depth that enables the geometry line model. Geometry line model may be enabled when the octree partition depth is between the specified range.

Figure 2D:

Referring now to FIG. 2D, a syntax parameter 200D for signaling the minimum depth in the geometry parameter set is depicted.

Figure 2E:

Referring now to FIG. 2E, a syntax parameter 200E for signaling the maximum depth in the geometry parameter set is depicted.

Referring now to FIG. 2F, a syntax parameter 200F for signaling a depth number in the geometry parameter set is depicted. The geometry line model may only be allowed at a certain octree partition depth. line_present_depth may specify the octree partition depth where the geometry line model is enabled.

Referring now to FIG. 2G, a syntax parameter 200G depicts a flag to indicate whether encoding the residuals between the original point position and the reconstructed point position on the line may be enabled. gps_line_signal_residual_flag equal to 1 may specify signaling of residuals between the original point position and the reconstructed point position may be enabled. gps_line_signal_residual_flag equal to 0 may specify signaling of residuals may be disabled.

Referring now to FIG. 2H, a syntax parameter 200H for signaling different quantization step-sizes for parameters of line reconstruction (e.g., start and end positions, direction vector, intervals of projections on the line, geometry residuals, respectively). Note that except for the number of points (N), all the other parameters in the line model can be quantized before encoding. The quantization can be applied by simply dividing a certain quantization step-size, larger value of the step-size will introduce more errors in the reconstruction. These quantization step-sizes of line parameters can be either fixed or specified by syntaxes in bitstream. Taking the start position as an example, the quantization can be performed as $$a'_x = \text{round}\left(\frac{a_x}{Q_{sp}}\right), a'_y = \text{round}\left(\frac{a_y}{Q_{sp}}\right), a'_z = \text{round}\left(\frac{a_z}{Q_{sp}}\right),$$

where a'=(a'$_x$, a'$_y$, a'$_z$) indicates the quantized start position, $Q_{sp}$ is the quantization step-size of start positions. Then, the reconstruction of the start position can be performed as $\hat{a}_x$=a'$_x$·$Q_{sp}$, $\hat{a}_y$=a'$_y$·$Q_{sp}$, $\hat{a}_z$=a'$_z$·$Q_{sp}$.

The direction of the line may be represented in spherical coordinates, and θ and φ may be quantized separately using different quantization step-sizes. line_qs_start_pos may specify the quantization step-size of start positions of lines. line_qs_end_pos may specify the quantization step-size of end positions of lines. line_qs_dir_theta may specify the quantization step-size of θ. line_qs_dir_phi may specify the quantization step-size of φ. line_qs_interval may specify the quantization step-size of intervals of line projections. line_qs_residual may specify the quantization step-size of geometry residuals of lines.

Referring now to FIG. 2I, a syntax parameter 200I for specifying the quantization step-sizes of θ and φ by a single syntax parameter is depicted. line_qs_dir may specify the quantization step-size of θ and φ as line_qs_dir_theta=line_qs_dir*$C_1$, line_qs_dir_phi=line_qs_dir*$C_2$, where $C_1$ and $C_2$ may be model parameters.

Referring now to FIG. 2J, a syntax parameter 200J for signaling only one parameter for all quantization step-sizes is depicted. line_qs_lambda may specify all quantization step-sizes in geometry line model, they can be functions of the specified line_qs_lambda. Examples may include: line_qs_dir_theta=line_qs_lambda*$C_1$, line_qs_dir_phi=line_qs_lambda*$C_2$, line_qs_interval=line_qs_lambda*$C_3$, line_qs_residual=line_qs_lambda*$C_4$, line_qs_start_pos=line_qs_lambda*$C_5$, and line_qs_end_pos=line_qs_lambda*$C_6$, where $C_1$, $C_2$, . . . , $C_6$ are model parameters. It may be appreciated that the functions can be in any other forms with more model parameters and that only a subset of functions may be used. For example, line_qs_end_pos and line_qs_dir may not specified at the same time, indicating if one of them is specified the other one may not need to be specified.

Referring now to FIG. 2K, a syntax parameter 200K signaling the start and end positions of a line is depicted. The start position of the line may be mandatory for line reconstruction, while the end position may be replaced by the line direction vector. In this case, the start and end positions of the line may be specified. geo_number_lines may specify the number of lines. For each line, geo_line_pnt_count_minus_min_num [i] may specify the number of points on the line as geo_line_pnt_count[i]=geo_line_pnt_count_minus_min_num [i]+LineMinNumPnt, where LineMinNumPnt may be either fixed or specified in high level syntax by line_min_num_point_minus_two. geo_line_start_pos_x [i], geo_line_start_pos_y [i] and geo_line_start_pos_z [i] may specify the start position of the line in Cartesian coordinates. geo_line_end_pos_x [i], geo_line_end_pos_y [i] and geo_line_end_pos_z [i] may specify the end position of the line in Cartesian coordinates.

Referring now to FIG. 2L, a syntax parameter 200L for quantizing the start and end positions before encoding is depicted. geo_line_start_pos_x_quant[i], geo_line_start_pos_y_quant[i] and geo_line_start_pos_z_quant[i] may specify the start position of the line in Cartesian coordinates as $\hat{a}_x$=geo_line_start_pos_x_quant[i]*line_qs_start_pos, $\hat{a}_y$=geo_line_start_pos_y_quant[i]*line_qs_start_pos, and $\hat{a}_z$=geo_line_start_pos_z_quant[i]*line_qs_start_pos. geo_line_end_pos_x_quant[i], geo_line_end_pos_y_quant[i]

and geo_line_end_pos_z_quant[i] may specify the end position of the line in Cartesian coordinates as ê$_x$=geo_line_end_pos_x_quant[i]*line_qs_end_pos, ê$_y$=geo_line_end_pos_y_quant[i]*line_qs_end_pos, and ê$_z$=geo_line_end_pos_z_quant[i]*line_qs_end_pos.

Referring now to FIG. 2M, a syntax parameter 200M for signaling the end positions as the differences of start positions is depicted. geo_line_end_pos_x_minus_start_pos_x [i], geo_line_end_pos_y_minus_start_pos_y [i] and geo_line_end_pos_z_minus_start_pos_z [i] specify the end position of the line in Cartesian coordinates as geo_line_end_pos_x[i]=geo_line_end_pos_x_minus_start_pos_x[i]+geo_line_start_pos_x[i], geo_line_end_pos_y[i]=geo_line_end_pos_y_minus_start_pos_y[i]+geo_line_start_pos_y[i], and geo_line_end_pos_z[i]=geo_line_end_pos_z_minus_start_pos_z[i]+geo_line_start_pos_z[i].

Referring now to FIG. 2N, a syntax parameter 200N for signaling syntaxes inside the octree coding is depicted. The variable GeoLineModelFlagPresent may determines whether the geometry line model may be enabled.

Referring now to FIG. 2O, a syntax parameter 200O for signaling the start position and the direction vector of the line is depicted. The direction vector can be specified in Cartesian coordinates, i.e., ($b_x$, $b_y$, $b_z$). geo_line_dir_x [i], geo_line_dir_y [i] and geo_line_dir_z [i] may specify the direction of the line in Cartesian coordinates. The length of the direction vector may be normalized to be unit vector or be equal to the length of the line segment. For the latter case, the end position of the line can be inferred as geo_line_end_pos_x[i]=geo_line_dir_x[i]+geo_line_start_pos_x[i], geo_line_end_pos_y[i]=geo_line_dir_y[i]+geo_line_start_pos_y[i], and geo_line_end_pos_z[i]=geo_line_dir_z[i]+geo_line_start_pos_z[i].

Referring now to FIG. 2P, a syntax parameter 200P for specifying the direction vector can be specified in Cartesian coordinates, i.e., ($b_x$, $b_y$, $b_z$) is depicted. The quantization may be applied to the direction vectors. geo_line_dir_x_quant [i], geo_line_dir_y_quant [i] and geo_line_dir_z_quant [i] may specify the direction of the line in Cartesian coordinates as geo_line_dir_x[i]=geo_line_dir_x_quant[i]*line_qs_dir, geo_line_dir_y[i]=geo_line_dir_y_quant[i]*line_qs_dir, and geo_line_dir_z[i]=geo_line_dir_z_quant[i]*line_qs_dir.

Referring now to FIG. 2Q, a syntax parameter 200Q for specifying the direction vector in spherical coordinates (i.e., ($\hat{\theta}$, $\hat{\phi}$)) is depicted. geo_line_dir_theta_sign [i] may specify the sign of $\hat{\theta}$ and geo_line_dir_abs_theta_quant [i] may specify the absolute value of $\hat{\theta}$. $\hat{\theta}$ can then be derived as $\hat{\theta}$=geo_line_dir_abs_theta_quant [i]*line_qs_dir_theta if geo_line_dir_theta_sign==1. Otherwise, $\hat{\theta}$=-geo_line_dir_abs_theta_quant [i]*line_qs_dir_theta. geo_line_dir_phi_sign [i] may specify the sign of $\hat{\phi}$ and geo_line_dir_abs_phi_quant [i] may specify the absolute value of $\hat{\phi}$. $\hat{\phi}$ can then be derived as $\hat{\phi}$=geo_line_dir_abs_phi_quant [i]*line_qs_dir_phi if geo_line_dir_phi_sign==1. Otherwise, $\hat{\phi}$=-geo_line_dir_abs_phi_quant [i]*line_qs_dir_phi.

Referring now to FIG. 2R, a syntax parameter 200R for restricting $\hat{\phi}$ as a positive value is depicted. geo_line_dir_phi_sign [i] may not be signaled. geo_line_dir_phi_quant [i] may specify the value of $\hat{\phi}$ as $\hat{\phi}$=geo_line_dir_phi_quant [i]*line_qs_dir_phi.

Referring now to FIG. 2S, a syntax parameter 200S for signaling the projection intervals on the line is depicted. The projection intervals (i.e., $d_j$) may be represented in multiple ways. According to different representations, the signaling of the projection intervals differs. For example, the projection intervals may be signaled for every two neighboring projection positions on the line. geo_line_interval [i][j] may specify the projection intervals of every two neighboring projection positions, i.e., $d_j$=geo_line_interval[i][j], and the reconstructed position of point j on the line i can be derived as $\hat{p}_j = \Sigma_{k=0}^{j} d_k$.

Referring now to FIG. 2T, a syntax parameter 200T for signaling the projection intervals for every two neighboring projection positions on the line and applying the quantization to the intervals is depicted. geo_line_interval_quant [i][j] may specify the projection intervals of every two neighboring projection positions as $d_j$=geo_line_interval_quant[i] [j]*line_qs_interval. The reconstructed position of point j on the line i can be derived as $\hat{p}_j = \Sigma_{k=0}^{j} d_k$.

Referring now to FIG. 2U, a syntax parameter 200U for specifying the averaged projection interval, assuming all points are evenly distributed on the line, is depicted. geo_line_avg_interval [i] may specify the average projection interval, i.e., $\overline{d}$=geo_line_avg_interval[i]. The reconstructed position of point j on the line i can be derived as $\hat{p}_j = \overline{d} \cdot j$.

Referring now to FIG. 2V, a syntax parameter 200V for specifying the averaged projection interval, assuming all points are evenly distributed on the line and quantization is applied, is depicted. geo_line_avg_interval_quant [i] may specify the average projection interval, i.e., $\overline{d}$=geo_line_avg_interval_quant[i]*line_qs_interval. The reconstructed position of point j on the line i can be derived as $\hat{p}_j = \overline{d} \cdot j$.

Referring now to FIG. 2W, a syntax parameter 200W for specifying the projection interval by assuming the points are piece-wise evenly distributed on the line is depicted. geo_line_num_segment [i] may specify the number of line segments. For each segment s, two syntaxes may be specified then, geo_line_segment_num_interval [i] [s] may specify the number of intervals associated with the segment, denoted as $N_s$, geo_line_segment_avg_interval [i] [s] may specify the average interval of the segment s, i.e., $\overline{d}_s$=geo_line_segment_avg_interval [i] [s]. The reconstructed position of the $j^{th}$ point of the segment s on the line i can be derived as:

$$\hat{p}_{s,j} = \begin{cases} j \cdot \overline{d}_0 & \text{if } s = 0 \\ j \cdot \overline{d}_s + \sum_{k=0}^{s-1} \{N_k \cdot \overline{d}_k\} & \text{otherwise} \end{cases}, \quad \text{(Eq. 1)}$$

where $j = 0, \ldots, N_s - 1$.

Referring now to FIG. 2X, a syntax parameter 200_for specifying the projection interval by assuming the points are piece-wise evenly distributed on the line and quantization is applied, is depicted. geo_line_num_segment [i] may specify the number of line segments. For each segment s when two syntaxes may be specified, then geo_line_segment_num_pnt [i] [s] may specify the number of points associated with the segment, denoted as $N_s$ and geo_line_segment_avg_interval_quant [i] [s] may specify the average interval of the segment s, i.e., $d_s$=geo_line_segment_avg_interval_quant [i] [s]*line_qs_interval. The reconstructed position of the $j^{th}$ point of segment s on the line can be derived as $$\hat{p}_{s,j} = \begin{cases} j \cdot \overline{d}_0 & \text{if } s = 0 \\ j \cdot \overline{d}_s + \sum_{k=0}^{s-1} \{N_k \cdot \overline{d}_k\} & \text{otherwise} \end{cases}, \quad \text{(Eq. 2)}$$

where $j = 0, \ldots, N_s - 1$.

Referring now to FIG. 2Y, a syntax parameter 200Y for signaling the geometry residuals of the line is depicted. The geometry residuals can be specified to recover the original point positions as the point positions may not be located on the line. The geometry residuals may be specified without quantization, in which case lossless geometry coding can be achieved. geo_line_residual_x [i] [j], geo_line_residual_y [i] [j] and geo_line_residual_z [i] [j] may specify the geometry residuals in Cartesian coordinates for each point j on the line i, i.e., $r_j$={geo_line_residual_x [i] [j], geo_line_residual_y[i] [j], geo_line_residual_z [i][j]}.

Referring now to FIG. 2Z, a syntax parameter 200Z for specifying the geometry residuals with quantization is depicted. geo_line_residual_x_quant [i] [j], geo_line_residual_y_quant [i] [j] and geo_line_residual_z_quant [i] [j] specify the geometry residual in Cartesian coordinates for each point j on the line, i.e., $r_j$={geo_line_residual_x_quant [i][j] ·line_qs_residual, geo_line_residual_y_quant[i] [j] ·line_qs_residual, geo_line_residual_z_quant[i] [j] ·line_qs_residual}.

Figure 3:
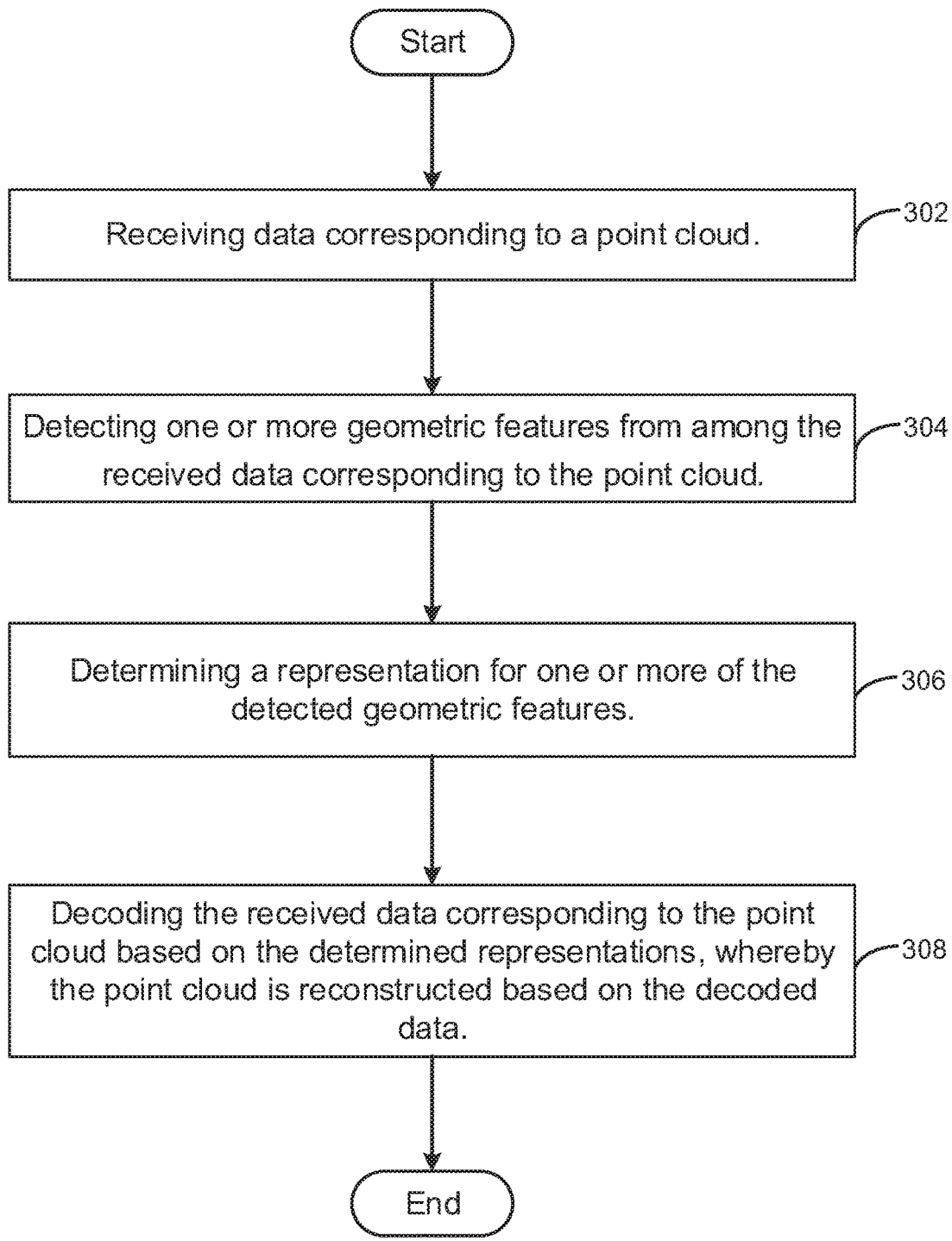
FIG. 3 is an operational flowchart illustrating the steps carried out by a program for point cloud coding, according to at least one embodiment.

Referring now to FIG. 3, an operational flowchart 300 illustrating the steps carried out by a program for point cloud coding is depicted. FIG. 3 may be described with the aid of FIGS. 1 and 2A-2Z. As previously described, the Point Cloud Coding Program 116 (FIG. 1) may quickly and effectively decode point cloud data using geometric features identified from the point cloud data.

At 302, data corresponding to a point cloud is received. The data may correspond to a still image or video data from which one or more frames may be extracted. In operation, the Point Cloud Coding Program 116 (FIG. 1) on the server computer 114 (FIG. 1) may receive data corresponding to a point cloud from the computer 102 (FIG. 1) over the communication network 110 (FIG. 1) or may retrieve the video data 200 from the database 112 (FIG. 1).

At 304, one or more geometric features are detected from the received data corresponding to the point cloud. The geometric features, e.g. a line, a parabola, a circle, an eclipse, a plane, a cylinder, a cube, etc., may be detected in 3D space. For example, line detection may be performed before octree coding or inside the octree coding. Line detection may also be performed before the geometry quantization or after the geometry quantization. If the lines are detected before octree coding, they may be extracted from the entire point cloud or extracted from smaller segments by partitioning the original point cloud into regions. If the lines are detected during octree partitioning, then for each octree partition node, if certain criteria are met, line detection is performed to all the points inside current node. In operation, the Point Cloud Coding Program 116 (FIG. 1) on the server computer 114 (FIG. 1) may detect one or more geometric features, such as lines, from the received data corresponding to the point cloud.

At 306, a representation is determined for one or more of the detected geometric features. The features may be represented as start and end points or start points and direction vectors such that they may be reconstructed based on mathematical equations. In operation, the Point Cloud Coding Program 116 (FIG. 1) on the server computer 114 (FIG. 1) may represent the detected geometric features as mathematical equations using the syntax elements 200A-200Z (FIGS. 2A-2Z).

At 308, the received data corresponding to the point cloud is decoded based on the determined representations, whereby the point cloud is reconstructed from the decoded data. By utilizing the determined representations to encode the data, regions of the point cloud may be encoded as geometric features to save on computing resources. For example, points that roughly correspond to a line segment may be encoded directly as a line segment. Thus, by decoding the data that may be encoded as the geometric feature data, the point cloud may be reconstructed. In operation, the Point Cloud Coding Program 116 (FIG. 1) on the server computer 114 (FIG. 1) may decode the data corresponding to the point cloud using one or more image or video encoding techniques based on the status of the syntax elements 200A-200Z (FIGS. 2A-2Z) and may use the decoded data to reconstruct the point cloud.

It may be appreciated that FIG. 3 provides only an illustration of one implementation and does not imply any limitations with regard to how different embodiments may be implemented. Many modifications to the depicted environments may be made based on design and implementation requirements.

Figure 4:
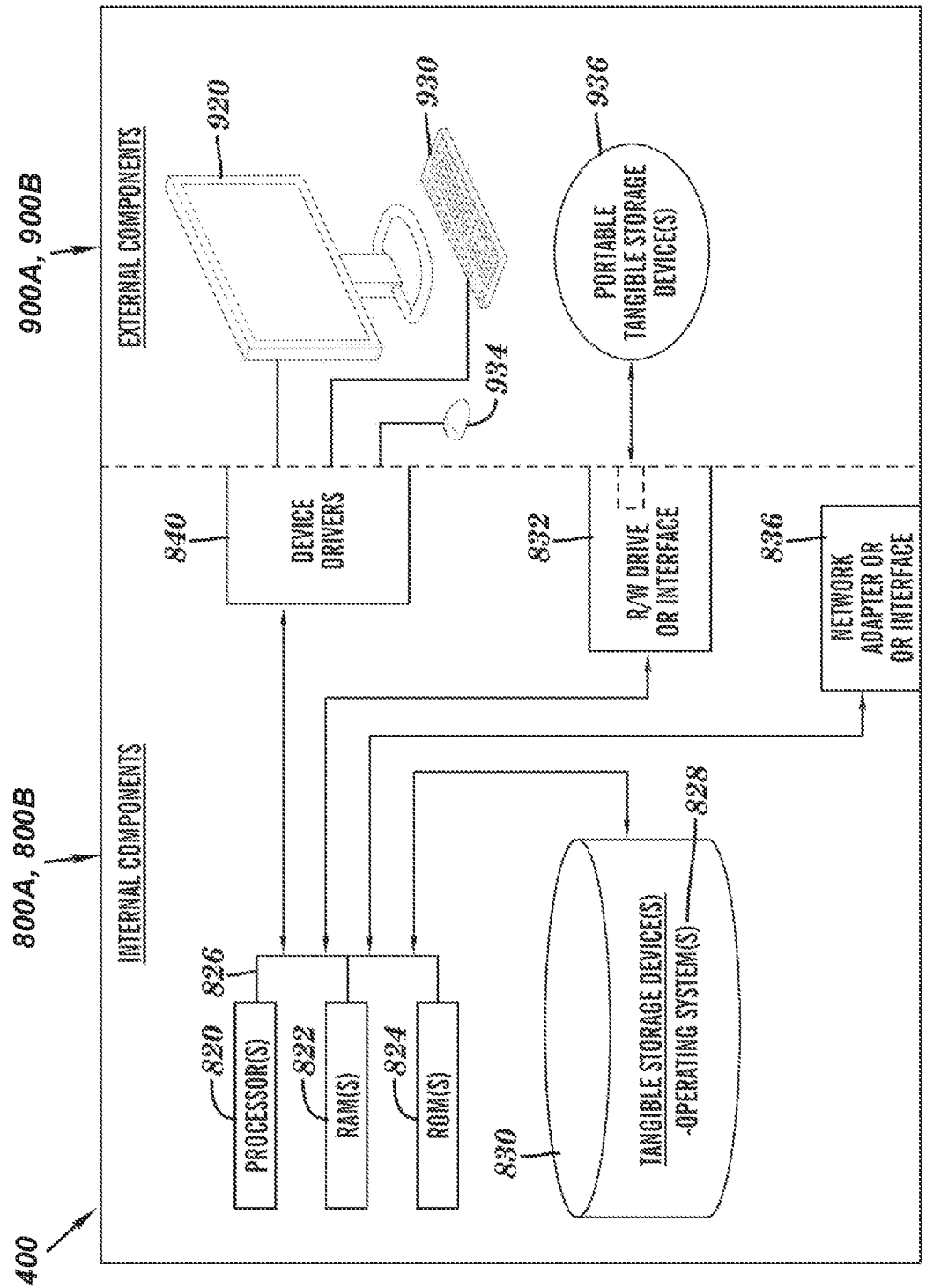
FIG. 4 is a block diagram of internal and external components of computers and servers depicted in FIG. 1 according to at least one embodiment.

FIG. 4 is a block diagram 400 of internal and external components of computers depicted in FIG. 1 in accordance with an illustrative embodiment. It should be appreciated that FIG. 4 provides only an illustration of one implementation and does not imply any limitations with regard to the environments in which different embodiments may be implemented. Many modifications to the depicted environments may be made based on design and implementation requirements.

Computer 102 (FIG. 1) and server computer 114 (FIG. 1) may include respective sets of internal components 800A,B and external components 900A,B illustrated in FIG. 4. Each of the sets of internal components 800 include one or more processors 820, one or more computer-readable RAMs 822 and one or more computer-readable ROMs 824 on one or more buses 826, one or more operating systems 828, and one or more computer-readable tangible storage devices 830.

Processor 820 is implemented in hardware, firmware, or a combination of hardware and software. Processor 820 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. Bus 826 includes a component that permits communication among the internal components 800A,B.

The one or more operating systems 828, the software program 108 (FIG. 1) and the Point Cloud Coding Program 116 (FIG. 1) on server computer 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory, an optical disk, a magneto-optic disk, a solid state disk, a compact disc (CD), a digital versatile disc (DVD), a floppy disk, a cartridge, a magnetic tape, and/or another type of non-transitory computer-readable tangible storage device that can store a computer program and digital information.

Each set of internal components 800A,B also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the software program 108 (FIG. 1) and the Point Cloud Coding Program 116 (FIG. 1) can be stored on one or more of the respective portable computer-readable tangible storage devices 936, read via the respective R/W drive or interface 832 and loaded into the respective hard drive 830.

Each set of internal components 800A,B also includes network adapters or interfaces 836 such as a TCP/IP adapter cards; wireless Wi-Fi interface cards; or 3G, 4G, or 5G wireless interface cards or other wired or wireless communication links. The software program 108 (FIG. 1) and the Point Cloud Coding Program 116 (FIG. 1) on the server computer 114 (FIG. 1) can be downloaded to the computer 102 (FIG. 1) and server computer 114 from an external computer via a network (for example, the Internet, a local area network or other, wide area network) and respective network adapters or interfaces 836. From the network adapters or interfaces 836, the software program 108 and the Point Cloud Coding Program 116 on the server computer 114 are loaded into the respective hard drive 830. The network may comprise copper wires, optical fibers, wireless transmission, routers, firewalls, switches, gateway computers and/or edge servers.

Each of the sets of external components 900A,B can include a computer display monitor 920, a keyboard 930, and a computer mouse 934. External components 900A,B can also include touch screens, virtual keyboards, touch pads, pointing devices, and other human interface devices. Each of the sets of internal components 800A,B also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, some embodiments are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
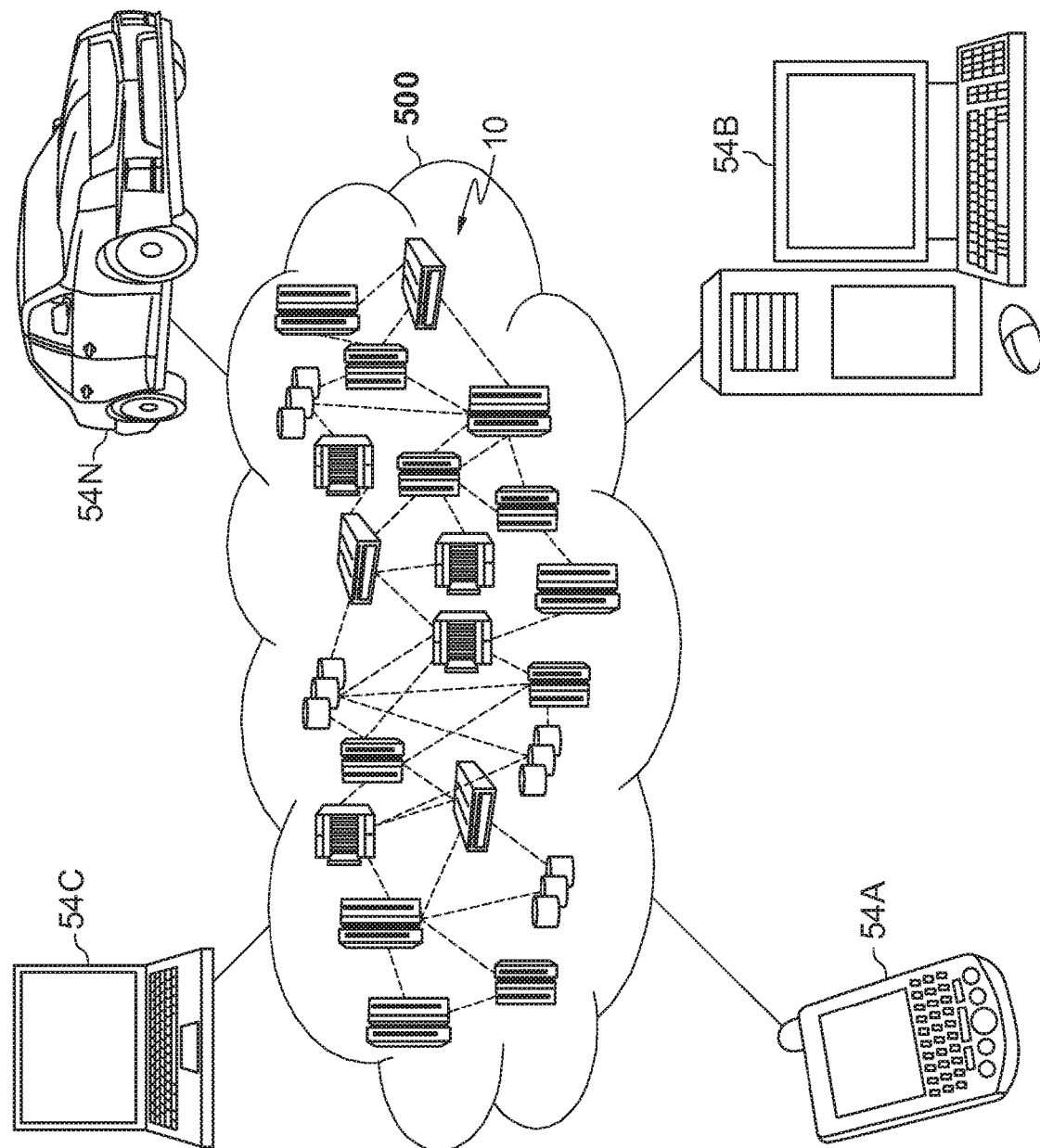
FIG. 5 is a block diagram of an illustrative cloud computing environment including the computer system depicted in FIG. 1, according to at least one embodiment.

Referring to FIG. 5, illustrative cloud computing environment 500 is depicted. As shown, cloud computing environment 500 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 54A-N shown in FIG. 5 are intended to be illustrative only and that cloud computing nodes 10 and cloud computing environment 500 can communicate with any type of computerized device over any type of network and/or network addressable connection (e.g., using a web browser).

Figure 6:
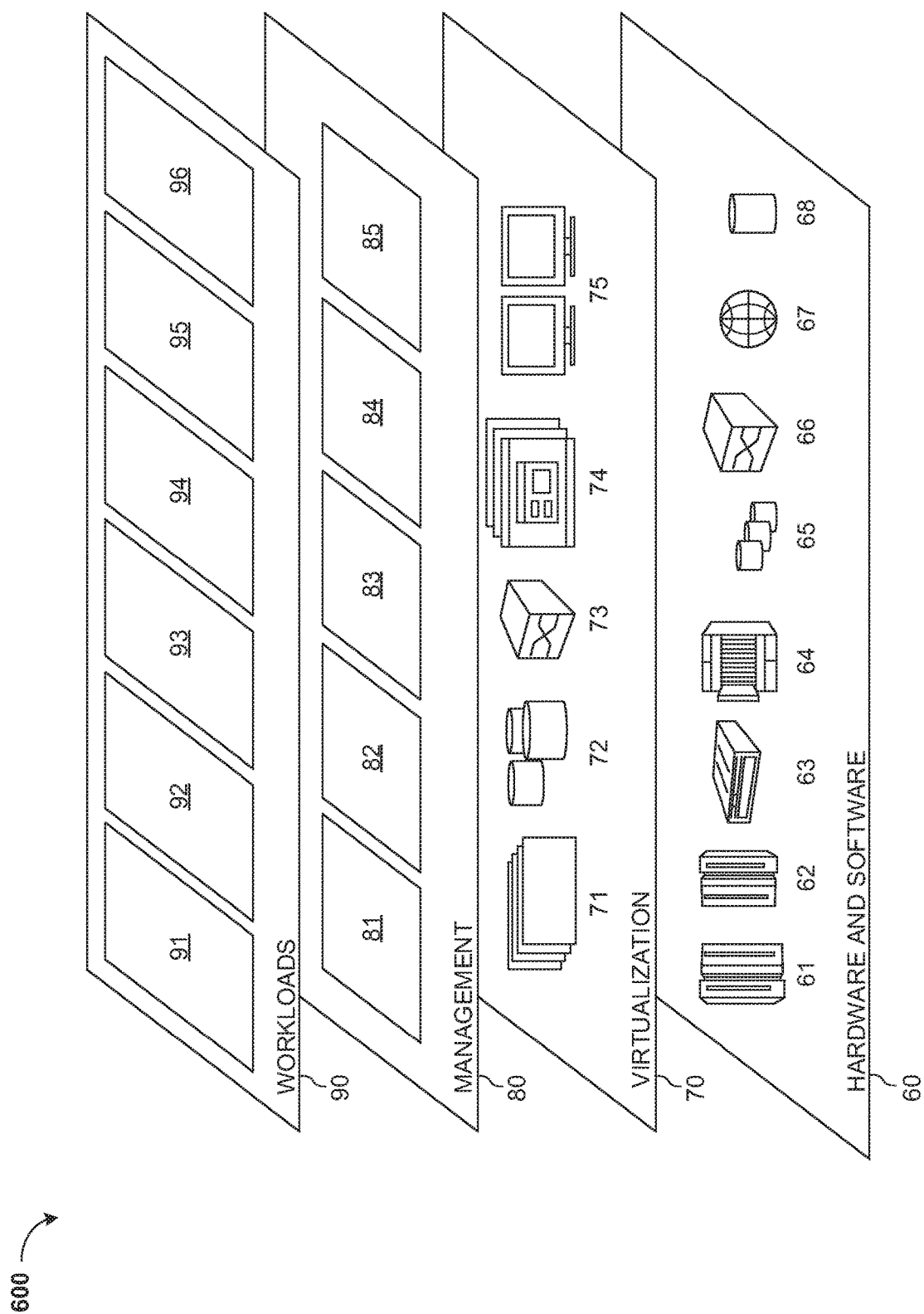
FIG. 6 is a block diagram of functional layers of the illustrative cloud computing environment of FIG. 6, according to at least one embodiment.

Referring to FIG. 6, a set of functional abstraction layers 600 provided by cloud computing environment 500 (FIG. 5) is shown. It should be understood in advance that the components, layers, and functions shown in FIG. 6 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Point Cloud Coding 96. Point Cloud Coding 96 may detect geometric features from point cloud data for encoding of the point cloud data.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of point cloud coding, executable by a processor, comprising:
   receiving data corresponding to a point cloud;
   detecting one or more geometric features from among the received data corresponding to the point cloud;
   determining a representation for the one or more geometric features, wherein a detected feature from among the one or more detected geometric features is specified as a start point and an end point; and
   decoding the received data corresponding to the point cloud based on the determined representations, wherein the point cloud is reconstructed based on the decoded data.

2. The method of claim 1, further comprising signaling each of the determined representations.

3. The method of claim 1, wherein the geometric features comprise one or more of a line, a parabola, a circle, an eclipse, a plane, a cylinder, and a cube.

4. The method of claim 1, wherein the representation for one or more of the one or more detected geometric features is determined based on a flag being set to indicate whether a geometry line model is enabled or disabled.

5. The method of claim 1, wherein the determined representations are quantized prior to encoding.

6. A computer system for point cloud coding, the computer system comprising:
  one or more computer-readable non-transitory storage media configured to store computer program code; and
  one or more computer processors configured to access said computer program code and operate as instructed by said computer program code, said computer program code including:
    receiving code configured to cause the one or more computer processors to receive data corresponding to a point cloud;
    detecting code configured to cause the one or more computer processors to detect one or more geometric features from among the received data corresponding to the point cloud;
    determining code configured to cause the one or more computer processors to determine a representation for one or more of the detected geometric features, wherein a detected feature from among the one or more detected geometric features is specified as a start point and an end point; and
    decoding code configured to cause the one or more computer processors to decode the received data corresponding to the point cloud based on the determined representations, wherein the point cloud is reconstructed based on the decoded data.

7. The computer system of claim 6, further comprising signaling code configured to cause the one or more processors to signal each of the determined representations.

8. The computer system of claim 6, wherein the geometric features comprise one or more of a line, a parabola, a circle, an eclipse, a plane, a cylinder, and a cube.

9. The computer system of claim 6, wherein the representation for one or more of the one or more detected geometric features is determined based on a flag being set to indicate whether a geometry line model is enabled or disabled.

10. The computer system of claim 6, wherein the determined representations are quantized prior to encoding.

11. A non-transitory computer readable medium having stored thereon a computer program for point cloud coding, the computer program configured to cause one or more computer processors to:
  receive data corresponding to a point cloud;
  detect one or more geometric features from among the received data corresponding to the point cloud;
  determine a representation for one or more of the detected geometric features, wherein a detected feature from among the one or more detected geometric features is specified as a start point and an end point; and
  decode the received data corresponding to the point cloud based on the determined representations, wherein the point cloud is reconstructed based on the decoded data.

12. The computer readable medium of claim 11, wherein the one or more processors are further configured to signal each of the determined representations.

13. The computer readable medium of claim 11, wherein the geometric features comprise one or more of a line, a parabola, a circle, an eclipse, a plane, a cylinder, and a cube.

14. The computer readable medium of claim 11, wherein the representation for one or more of the one or more detected geometric features is determined based on a flag being set to indicate whether a geometry line model is enabled or disabled.

15. The computer readable medium of claim 11, wherein the determined representations are quantized prior to encoding.

* * * * *